(12) United States Patent
Li et al.

(10) Patent No.: US 9,871,620 B2
(45) Date of Patent: Jan. 16, 2018

(54) PARAMETER FEEDBACK IN A WIRELESS COMMUNICATION SYSTEM

(75) Inventors: Shaohua Li, Beijing (CN); Xin Qi, Beijing (CN)

(73) Assignee: Nokia Solutions and Networks Oy, Espoo (FI)

(*) Notice: Subject to any disclaimer, the term of this patent is extended or adjusted under 35 U.S.C. 154(b) by 706 days.

(21) Appl. No.: 13/266,334

(22) PCT Filed: Apr. 27, 2009

(86) PCT No.: PCT/EP2009/055068
§ 371 (c)(1),
(2), (4) Date: Nov. 28, 2011

(87) PCT Pub. No.: WO2010/124715
PCT Pub. Date: Nov. 4, 2010

(65) Prior Publication Data
US 2012/0069808 A1    Mar. 22, 2012

(51) Int. Cl.
*H04L 1/00* (2006.01)
*H04L 5/00* (2006.01)

(52) U.S. Cl.
CPC ............ *H04L 1/0029* (2013.01); *H04L 5/006* (2013.01); *H04L 5/0007* (2013.01); *H04L 5/0064* (2013.01); *H04L 5/0094* (2013.01); *H04L 1/0026* (2013.01)

(58) Field of Classification Search
CPC ... H04W 72/04; H04W 72/046; H04W 72/06; H04W 72/08; H04W 72/10; H04L 1/0029; H04L 1/0026; H04L 5/0007; H04L 5/006; H04L 5/0064; H04L 5/0094

USPC ......................................... 370/252, 328, 329
See application file for complete search history.

(56) References Cited

U.S. PATENT DOCUMENTS

| | | | |
|---|---|---|---|
| 2008/0049813 A1* | 2/2008 | Kurose et al. | 375/141 |
| 2008/0153506 A1* | 6/2008 | Yin et al. | 455/452.2 |
| 2009/0296595 A1* | 12/2009 | Khoshnevis et al. | 370/252 |
| 2011/0134825 A1* | 6/2011 | Kim | H04L 5/0007 370/312 |

FOREIGN PATENT DOCUMENTS

| WO | WO 2008/051038 A1 | 5/2008 |
|---|---|---|
| WO | WO 2008/115772 A1 | 9/2008 |

OTHER PUBLICATIONS

R1-061819, "Overhead Reduction of UL CQI signaling for E-UTRA DL", Huawei, 3 GPP TSG RAN LTE Ad Hoc, Cannes, France, Jun. 27-30, 2006, 9 pgs.
R1-074983, "Periodic "best-M" CQI Reporting Scheme", Alcatel-Lucent, 3GPP TSG-RAN #51 WG 1 LTE, Jeju, Korea, Nov. 5-9, 2007, 7 pgs.
IEEE 802.16m-07/002r8, "IEEE 802.16m System Requirements", Jan. 15, 2009, 31 pgs.

(Continued)

*Primary Examiner* — Feben M Haile
(74) *Attorney, Agent, or Firm* — Harrington & Smith

(57) ABSTRACT

For using best M method in a mixed subband/miniband environment a Mobile Station Apparatus calculates a metric for sending information corresponding to the metric to a base station.

15 Claims, 2 Drawing Sheets

(56) References Cited

OTHER PUBLICATIONS

IEEE P802.16 Rev2/D9 Jan. 2009 "DRAFT Standard for Local and metropolitan area networks, Part 16: Air Interface for Broadband Wireless Access Systems" Sponsor LAN/MAN Standards Committee of the IEEE Computer Society and the IEEE Microwave Theory and Techniques Society; P802.16Rev2/D9 Jan. 2009 (Revision of IEEE Std 802.16-2004 and consolidates material from IEEE Std 802.16e-2005, IEEE Std 802.16-2004/Cor1-2005, IEEE Std 802.16f-2005 and IEEE Std 802.16g-2007.
IEEE 802.16m-07/0010r1a (working document) Mar. 2008, "Part 16: Air Interface for Fixed and Mobile Broadband Wireless Access Systems"; Advanced Air Interface (working document) (135 pages).
IEEE 802.16e-2005 and IEEE Std 802.16-2004/Cor1-2005 (Amendment and Corrigendum to IEEE Std 802.16-2004); IEEE Standard for Local and metropolitan area networks "Part 16: Air Interface for Fixed and Mobile Broadband Wireless Access Systems; Amendment 2: Physical and Medium Access Control Layers for Combined Fixed and Mobile Operation in Licensed Bands and Corrigendum 1" (Feb. 28, 2006), (864 pages).
IEEE standards 802.16-2004 (Revision of IEEE Std 802.16-2001) IEEE Standard for Local and metropolitan area networks "Part 16: Air Interface for Fixed Broadband Wireless Access Systems" IEEE Computer Society and the IEEE Microwave Theory and Techniques Society, Sponsored by the LAN/MAN Standards Committee; IEEE, 3 Park Avenue, New York, NY 10016-5997, USA; (Oct. 1, 2004), (895 pages).

* cited by examiner

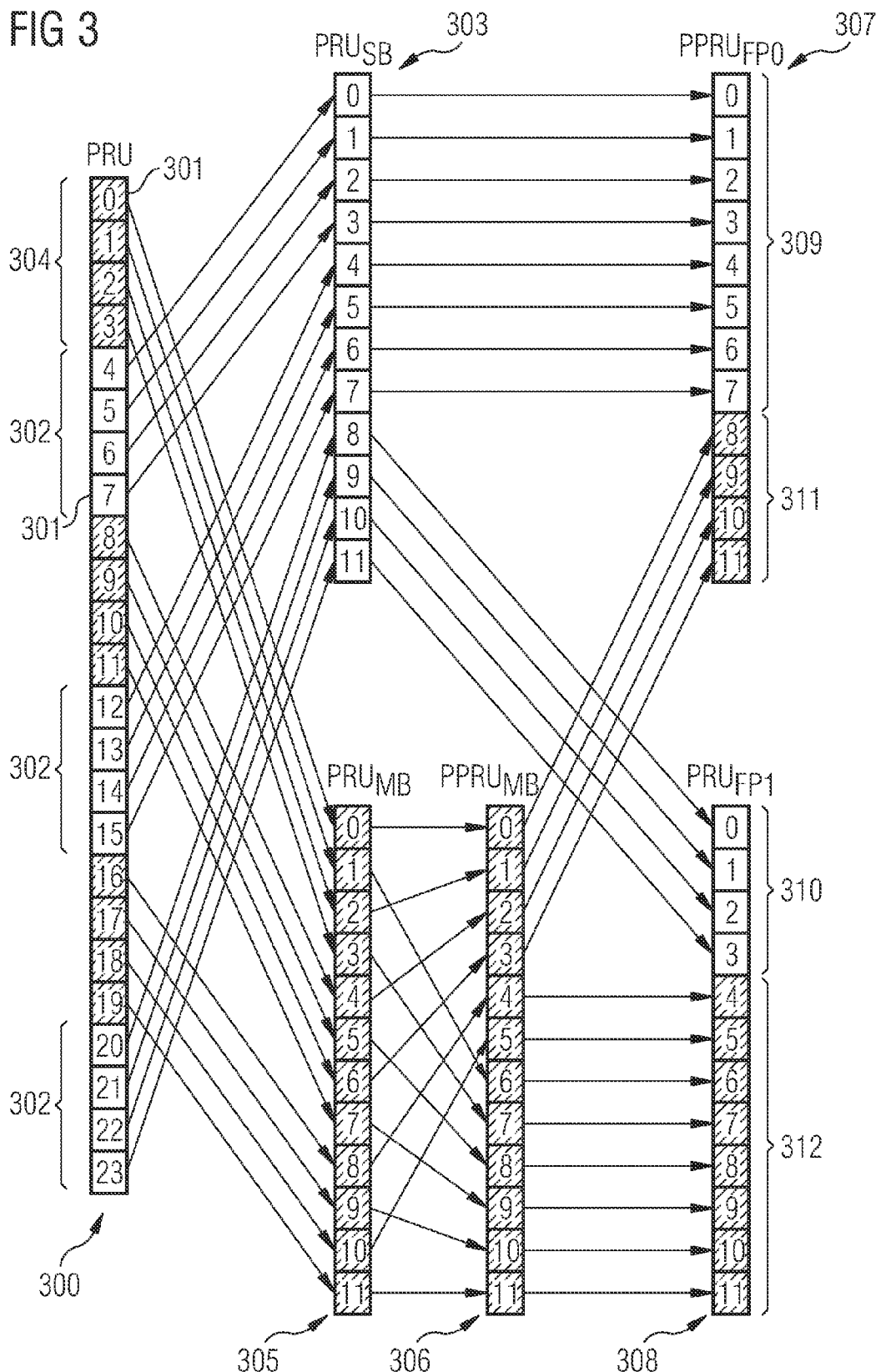

PARAMETER FEEDBACK IN A WIRELESS COMMUNICATION SYSTEM

The present invention relates to the technical field of mobile communication. In particular the present invention relates to a Mobile Station Apparatus for organizing a transmission resource between a Base Station Apparatus and a Mobile Station Apparatus, a method for organizing a transmission resource, a Base Station Apparatus for allocating a transmission resource, a method for allocating a transmission resource, a computer-readable medium and a computer program product.

BACKGROUND OF THE INVENTION

In order to meet IMT-Advanced (International Mobile Telecommunications-Advanced) requirements an advanced air interface (AAI) may be targeted.

The document IEEE (Institute of Electrical and Electronics Engineerings) P802.16 ref 2/D9, "Draft standard for local and metropolitan area networks, part 16: Air interface for broadband wireless access systems", January 2009, may specify an air interface including the Medium Access Control Layer (MAC) and Physical Layer (PHY) of combined fixed and mobile point-to-multipoint Broadband Wireless Access (BWA) systems.

The document IEEE 802.16M-07/002R8, "IEEE 802.16M System Requirements, Requirements for P802.16M-Advanced Air Interface", 15 Jan. 2009, may describe amendments to the IEEE802.16 WirelessMAN-OFDMA Specification to provide an advanced air interface.

The document IEEE 802.16M-09/0010R1A, "Part 16: Air Interface for Fixed and Mobile Broadband Wireless Access Systems Advanced Air Interface (working document)", March 2008, may describe an advanced air interface.

The document R1-074983, 3GPP TSG-RAN#51 WG1 LTE, "Periodic "Best-M" CQI (Channel Quality Identifier) Reporting Scheme", Jeju, Korea, 5 Nov.-9 Nov. 2007 may describe "Best-M" CQI reporting scheme for use for aperiodic reporting of CQI.

There may be a need to provide a more efficient feedback mechanism between a Mobile Station Apparatus and a Base Station Apparatus.

SUMMARY OF THE INVENTION

According to an exemplary embodiment of the present invention, a Mobile Station Apparatus for organizing a transmission resource between a Base Station Apparatus and a Mobile Station Apparatus, a method for organizing a transmission resource, a Base Station Apparatus for allocating a transmission resource, a method for allocating a transmission resource, a computer-readable medium and a computer program product may be provided.

According to an exemplary embodiment of the present invention, a Mobile Station Apparatus for organizing, scheduling or structuring a transmission resource between a Base Station Apparatus and a Mobile Station Apparatus dependent on a task may be provided. The Mobile Station Apparatus may comprise a Receiving Device, a Determining Device and a Provisioning Device. The Receiving Device may be adapted for receiving information via a plurality of resource blocks of the transmission resource and for gathering from the received information at least one physical parameter of each of the plurality of resource blocks.

In an example, the Determining Device may be adapted for determining a metric profile corresponding to the actual task, which task may have to be executed by the Mobile Station Apparatus and/or by the Base Station Apparatus.

The Determining Device of the Mobile Station Apparatus may further be adapted for determining or calculating a metric or a metric value for each of the plurality of resource blocks by applying the metric profile to the at least one physical parameter using a predetermined rule dependent from the actual task. The rule may be a metric function composed by applying the metric profile.

In an example the rule or metric function may also be included in the metric profile, i.e. the profile may also comprise the rule.

The physical parameter may not only be limited to the resource block, but can also relate to an physical resource of the Base Station Apparatus and/or the Mobile Station Apparatus, such as a buffer state of the Base Station Apparatus.

The Provisioning Device may be adapted for providing information of the metric to the Base Station Apparatus. The information of the metric may be provided, by determining a Channel Quality Indicator (CQI) and/or a Preferred Matrix Index (PMI). The Mobile Station Apparatus may use a feedback channel for providing the determined metric to the Base Station Apparatus. In another example the provisioning Device may provide the metric and the PMI.

In an example, this implementation may provide a feedback mechanism for a closed loop MIMO (Multiple Input and multiple output) System.

In another example the Provisioning Device may be adapted for providing information of the metric to the Base Station Apparatus.

In a further example the metric profile may comprises at least one weight parameter for the corresponding at least one physical parameter of the resource block. The weight parameter may represent a measure, a rate, an extent or a value for the significance, the preference and/or the priority of the corresponding at least one physical parameter of the resource block with regard to a task or in relation to a task. This weight parameter may also indicate which physical parameter may be relevant for calculating the metric. The value that may be later associated with this weight parameter may indicate the significance to a corresponding resource.

In other words, every task or service, which potentially may have to be executed by the Mobile Station Apparatus and/or by the Base Station Apparatus may be represented by a corresponding metric profile, which profile may indicate how strong a physical parameter of a resource block may influence the execution of the task, e.g. the service delivery. The profile may allow composing an appropriate metric function.

According to another exemplary embodiment of the present invention, a method for organizing a transmission resource or a plurality of resource blocks may be provided. The method may comprise receiving information via a plurality of resource blocks of the transmission resource and gathering from the received information at least one physical parameter of each of the plurality of resource blocks. In an example, a Base Station Apparatus may provide by implicitly signaling or by explicitly signaling further physical parameter which may enable the Mobile Station Apparatus to determine a metric.

The method may further comprise determining a metric profile belonging to an actual task.

With the metric profile the method may allow determining a metric for each of the plurality of resource blocks by applying the metric profile to the at least one physical parameter using a predetermined rule dependent from the actual task or service.

The method may further comprise providing information of the determined metric to the Base Station Apparatus.

In a further example the metric profile may comprise at least one weight parameter or weight factor for the corresponding at least one physical parameter of the resource block or physical resources. The weight parameter may represent a measure for the significance of the corresponding at least one physical parameter of the resource block with regard to the task.

According to another exemplary embodiment of the present invention, a Base Station Apparatus for allocating a transmission resource may be provided. The Base Station Apparatus or the Base Station may comprise a Metric Receiving Device and a Structuring Device. In an example the Metric Receiving Device may be adapted for receiving information of a metric from a respective Mobile Station Apparatus.

The Structuring Device may be adapted for deciding whether the Base Station Apparatus may employ the information of the metric and the Structuring Device may be further adapted for structuring the transmission resource between the Base Station Apparatus and a Mobile Station Apparatus in accordance with the received information of the metric in the case of employing the information of the metric.

Structuring may mean partitioning a resource, however structuring in this context may also mean loading the appropriate already existing resource blocks with the appropriate information according to the determined metric.

Thus, the information of the metric may essentially only be a preferred value or a proposal of the Mobile Station Apparatus and the Base Station Apparatus may use its own criteria for deciding to use the information of the metric, the CQI and/or the PMI received from the Mobile Station Apparatus.

In an example, the Structuring Device may be adapted for structuring the transmission resource between the Base Station Apparatus and the Mobile Station Apparatus in accordance with the received metric information. In other words, the Base Station Apparatus may decide on the basis of the fed back metric which resource block may be used.

In another example, the metric may not be fed back directly from Mobile Station Apparatus to the Base Station Apparatus. Essentially only the decision which resources shall be used may be made based on the metric. The feedback may still be CQI and PMI. In an example the Structuring Device may divide a transmission resource, e.g. a frequency band, into portions or partitions e.g. into the resource blocks.

In an example, the transmission resource may be a physical available frequency band, which may be used for a communication between the Base Station Apparatus and the Mobile Station Apparatus.

In another example the structure may be fixed. However, the base station may decide, which partitions of the transmission resource may be utilised for a communication between Base Station Apparatus and Mobile Station Apparatus. The Base Station Apparatus may use a Scheduling Device inside the Structuring Device for deciding about the utilization of the resource blocks.

According to another exemplary embodiment of the present invention, a method for allocating or structuring a transmission resource may be provided. The method may comprise receiving information of a metric from a Mobile Station Apparatus and deciding about employing the information of the metric.

In the case of employing the information of the metric, the method may proceed with structuring or allocating the transmission resource between the Base Station Apparatus and a Mobile Station Apparatus in accordance with the received information of the metric.

According to another exemplary embodiment of the present invention, a computer-readable medium may be provided wherein the computer-readable medium may comprise a program code, which program code when being executed on a computer, may carry out at least one method of the method of organizing a transmission resource between a Base Station Apparatus and a Mobile Station Apparatus and the method for allocating the transmission resource.

According to yet another exemplary embodiment of the present invention, a computer program product may be provided, wherein the computer program product may comprise a program code, which, when being executed on a computer, may carry out at least one method of the method of organizing a transmission resource between a Base Station Apparatus and a Mobile Station Apparatus and the method for allocating a transmission resource.

For communicating, a Mobile Station Apparatus, an MS, an AMS, e.g. a cellular phone or a personal digital assistant (PDA) may get in contact with a Base Station Apparatus. The Mobile Station Apparatus and the Base Station Apparatus, the BS, the ABS, the NodeB, the eNodeB or the Base Station may communicate via an air interface or via a wireless interface. Thus, the MS and the BS may use a frequency band or a transmission resource between the Base Station Apparatus and the Mobile Station Apparatus for data exchange.

The quality of a connection when using a wireless interface for communicating may depend on the time. In other words, a frequency band or the transmission resource between the BS and the MS may change the transmission capability over the time caused by physical effects like reflections or fading effects. Also other physical conditions like a load condition of a buffer in the Base Station Apparatus may change.

Thus, at a first point in time a certain frequency may allow to transmit information with a high performance, whereas at a second time the same frequency may only provide a low performance. Therefore, an idea of OFDM (Orthogonal Frequency Division Multiplexing) may be finding at a certain point in time the certain frequencies or these portions of the resource, which may allow for a high performance for information transmission.

In order to find the transmission resources, which may provide for a high performance, the frequency band or the transmission resource may be divided into portions, partitions, sub-carrier, sub-frames, resource blocks or resource units. In the case of Advanced Air Interface the transmission resource may be divided in a plurality of types of resource blocks. This, may substantially increase the complexity for finding an optimum resource for transmission.

Information may be transmitted from the Base Station to the Mobile Station, i.e. downlink, and/or from the Mobile Station to the Base Station, i.e. uplink. Even if described for downlink, the principle described in this text may also apply for uplink.

In an example each downlink transmission resource may be framed as a downlink sub-frame. Such a downlink sub-frame may be divided into four or fewer frequency portions, frequency partitions or portions of the transmission resource. Each frequency portion may comprise sub-band-based CRU (Continuous Resource Unit), mini-band-based CRU and/or DRU (Distributed Resource Unit). Each subband may comprise $N_1=4$ adjacent PRUs (Physical Resource Units) and mini-band-based CRU may comprise $N_2=1$ PRUs, i.e. a single PRU. Thus, a plurality of different types of resource blocks may exist. An example for a type may be an adjacent resource block. Another example may be a distributed resource block.

The aspect of subdividing a downlink sub-frame and/or an uplink sub-frame in different types of resource blocks may further be described in document IEEE 802.16M-09/0010R1A.

CRUs may be substantially suitable for frequency selective allocations as they may provide a continuous allocation of sub-carriers in frequency, for example a closed-loop MIMO (Multiple Input Multiple Output) may be employed.

In order to support closed loop MIMO, a Channel Quality Indicator (CQI) and a Preferred Matrix Index (PMI) may be fed back to a Base Station by the Mobile Station, for example by an Advanced Mobile Station (AMS).

In order to reduce the volume of the information, which may be fed back from the AMS to an Advanced Base Station (ABS) the AMS may select the best-M sub-bands and/or mini-bands. In other words, the MS may determine M resource blocks from a plurality of resource blocks larger than M, which M resource blocks the MS may consider as being the best M resources for the planned task, e.g. for the planned service. For this purpose, M may be a predetermined value, which in an example may be fixed to be 5 in an IEEE 802.16E OFDMA (Orthogonal Frequency Division Multiple Access) system. This method, where the AMS for every received Channel Quality Indicator SNR may find the M best sub-bands and/or mini-bands, which may meet a predetermined requirement, for example concerning the performance, may be named as best-M method. This best-M method may be used to achieve a maximum spectrum efficiency.

A physical parameter or a transmission parameter may be any parameter, which may be used for describing a state or a condition of a physical resource. I.e. it may allow detecting whether a physical resource may be appropriate for e.g. the desired task or service and to which extent.

In another example, which may need more volume for feedback information, the AMS may not directly select and report the sub-bands and/or mini-bands, but may report all the CQIs and/or all the PMIs to the BS for all resource blocks. The BS then may have to decide which sub-bands and/or mini-bands it may use.

In other words, the method for selecting the appropriate sub-bands and/or mini-bands may either be implemented in the MS and/or in the BS. Dependent on the location, where the selection may be executed, corresponding signaling information, such as transmission of metric, CQI and/or PMI, may have to be provided between BS and MS. Further reduction of the signaling information may be achieved by substantially reporting only a single CQI value for a contiguous or adjacent resource block, e.g. an average value for the complete block.

In the case where the MS may select the best-M resource blocks, sub-bands and/or mini-bands, the MS may essentially only need to send a corresponding PMI information to the Base Station and the Base Station may use this information to send information or data to the MS. In an example, the MS may select which subband/minibands may be the essentially the best bands, and then may feedback metric, CQI and PMI for each band. The Base Station Apparatus may not have to care about selecting the best M resources.

In a sub-band-only or mini-band-only system, i.e. in a homogeneous system, the CQI value alone may be sufficient for deciding which portions of the sub-bands or which bands may be the best-M bands or the predetermined number of bands fulfilling a predetermined requirement. Sub-band and/or mini-band may be a type of a resource, a type of a resource block or a type of a portion of a transmission resource.

Therefore, in a system where the transmission resource may essentially solely be divided into portions of the transmission resource or into resource blocks of a single type, taking the CQI value as an indication or metric for classifying the quality of the bands and selecting the best-M bands may be sufficient. However, in a scenario where sub-band and/or mini-band divisions are used in parallel, i.e. resources of different types with possible different properties, a so-called sub-band/mini-band-mixed system may be used and some other criteria may have to be provided for finding the best M resource blocks.

It may be efficient to use a more complex metric instead of only using the CQI value, when deciding which bands may belong to the best M bands. The classifying in the best-M bands may change from time to time since the quality pre-requisitions of the different bands may change over the time. Therefore, periodically the MS may determine, which M bands of the plurality of bands may be used by the BS in order to send information to the MS. If all available bands may be utilized the efficiency may be substantially low. The reason could be that OFDMA (Orthogonal Frequency Division Multiplex Access) system may be a fading system. For some sub-band/minibands, the channel quality may be very bad, but for other subband/minibands, the channel quality may be very good. If the whole available bands may be used for information exchange, a lot of power may be consumed on the bad bands. The waste of power may be substantially prevented by selecting some good subband/miniband for information exchange in some time slot.

In a mixed system, i.e. in a system in which different types of bands may be used in parallel, e.g. sub-band and mini-band, it may be useful also to consider the type of resource. Thus, in a mixed system, the type of such a sub-band or mini-band may also be considered, when a good transmission resource selection may have to be made.

Since a sub-band may comprise upto $N_1=4$ adjacent PRUs, sub-band may provide a higher throughput than a mini-band if both may have the same CQI value. Adjacent PRU may also allow to feedback a single metric or a single CQI for a whole group of PRU, thus the signaling overhead may be reduced.

In a case for example where a large volume of data may have to be transmitted or in a case a large burst size may have to be transmitted, it may be better to choose best-M sub-bands instead of best-M mini-bands, even if the CQI values of some of the sub-bands may be lower than the CQI value of the mini-bands. Such considerations however may take into account the type of data or the information, which may have to be transmitted and the type of available resources like sub-band, mini-band, etc.

In an example a method for providing feedback for closed loop MIMO in a subband and miniband mixed system may be provided.

In another case, the selection of the appropriate type of resource may depend on the type of service, which may have to be transmitted. A small packet service, such as voice over IP (VoIP), internet gaming, real-time measurements or other real-time services may require a small bandwidth but a high reliability. For such real-time services therefore a good mini-band may be preferable to a good sub-band with the same CQI since in the case a sub-band may be employed, too many resources may be allocated which may not be utilized.

In another case, for example for a service, which may use a small sized burst, it may be preferable that a best-M mini-band may be selected, even if some mini-bands may have a bad CQI.

Therefore, many parameters may have to be taken into considerations when deciding about an appropriate type of resource for transmitting a certain information, for a certain task or for a certain service. Using only the CQI value without other parameters in the mixed scenario may not bring an optimal result. In other words, the appropriate type of resource may depend on the type of service, which may have to be used. Therefore, when selecting the resources by the MS and/or by the BS, the actual service, which may intend to use a connection between BS and MS may have to be taken into consideration.

Therefore, information about the task which may be executed or about the type of service may have to be communicated between BS and MS. For every available service, profiles may exist, wherein the profiles may comprise the parameters, which may be relevant for the certain type of service. Furthermore, using weights may allow regarding the most relevant parameters for a certain service. Weights for physical parameters, which may not be relevant for services may be set to zero or may not be regarded.

The relevant weights or factors of the metric function and their extend may be contained in a profile for a service. Such profile may be stored in the Mobile Station Apparatus, in the Base Station Apparatus and/or in a central server.

In an example, for one service a first and second parameter may be relevant, whereas for another second service a third, a fourth and a fifth parameter may be relevant.

Or in another example, for a first service the first parameter may be more relevant than the second parameter and for a second service the second parameter may be more relevant as the first parameter. How many different parameters may be relevant and in which measure they may be relevant may depend on the corresponding service. Each service may have a plurality of most relevant parameters.

In an example the CQI or SINR value may not be relevant when deciding about an appropriate resource type or resource block type. In another case however, the CQI value may be relevant in combination with at least one other non-CQI parameter or transmission parameter, wherein this other transmission parameter may differ from the CQI.

Thus, other factors or transmission parameters beside the CQI may be relevant to decide the best-M bands in a mixed system, in a mixed environment, e.g. in a sub-band/miniband-mixed system or in a heterogeneous system. In a heterogeneous system different types of resources such as sub-band and/or mini-band may be used in parallel to communicate between BS and MS. In a mixed environment using solely the CQI value as an indication for the best portions of resources may not deliver good results in a sub-band and mini-band mixed system.

Thus, it may be an aspect of the invention to use a metric to decide "best M" subbands/minibands in a best M method, which may be based not only on CQI of the corresponding resource block but may also contain other factors or physical parameter like the size of the resource, the quality of service (QoS), system load information, DL (Down Link) buffer status, service type, etc. The metric may also contain different weight $\alpha$ for subbands/minibands.

Each Mobile station may calculate the metric using the predefined function or rule, select the best M subbands/minibands e.g. with the highest metric and signalize the selected subbands/minibands back to the BS using the corresponding information of metric and PMI and/or of CQI and PMI. The BS may recognize the corresponding resource block, which the MS indicated as the preferred resource blocks for a certain task or service.

Since adjacent PRUs may be signaled with a single metric or a single CQI signaling resources may be saved.

Thus, a feedback mechanism for subband and miniband mixed systems may be provided.

A metric may be used, since in a mixed subband/miniband system the CQI value alone may not allow finding the best M resource blocks. By using the metric it may further be prevented in a mixed subband and miniband system to feedback CQI/PMI separately for subband and miniband. Since the number of subband in each frequency partition may be very limited in IEEE 802.16m a separate feedback mechanism might result in significant selective gain loss.

Each Mobile station may calculate the metric using the predefined metric function, may select the best M subbands/minibands and may signalize the selected subbands/minibands back to the BS. In an example the best M bands may be the M bands having the highest metric. The metric may be substantially only be used in order to find the best resource blocks. For signaling the information to the BS, the MS may still use the CQI and PMI values.

According to another exemplary embodiment of the present invention, the task may be at least one of providing a service and of transmitting a data packet and/or transmitting a voice packet.

Examples for services may be Voice-over-IP (VoIP), internet surfing, gaming, online music, online television, collaboration or data transmission.

The metric may allow finding an appropriate configuration of employing the portions of transmission resources. For one service resource blocks of one type or portions of the transmission resources of one type may be used in higher extent than resource blocks of other types portions of transmission resources of other types.

The selected resource blocks or portions of transmission resources, which may be used for a certain service may be communicated from the MS to the BS by using a CQI value or some value related to the metric and/or a PMI value. When signaling a CQI value from the MS to the BS, the BS may decide, which resources may have to be employed. By providing a PMI value the BS may make the decision on how to transmit information in the selected resources.

CQI or the metric may be used for scheduling. More specifically, CQI or the metric may be used to decide which bands shall be used to meet essentially the requirements for a task or service. But PMI may be used for how to use it in these selected bands.

According to another exemplary embodiment of the present invention, the Provisioning Device may be further adapted for selecting a predetermined number of the plurality of resource blocks indicated by CQI, PMI or metric, such that the selected resource blocks meet a predefined criteria best.

For example, a criteria may be the best-M band selection, wherein the fact which band may be the best may depend on the service which may have to be transported between the BS and the MS. With the aid of profiles for services the selection of the appropriate resources may be supported.

According to another exemplary embodiment of the present invention, the metric for each resource block may be at least one value selected from the group of values consisting of a metric value, a Channel Quality Indicator (CQI) and a Preferred Matrix Index (PMI) or Prefer Matrix Index. Any combination of these values may be provided to the BS.

A CQI parameter alone in a mixed resource type environment may not be such efficient as using other parameters, which may differ from the CQI value. However, in some cases especially, if sub-band only and/or mini-band only divisions of the transmission resource may be made, using the CQI value or using the CQI value in addition to non-CQI values or non-CQI transmission parameters may help to optimize the transmission quality for a service.

According to yet another exemplary embodiment of the present invention, each resource block or the portions of the transmission resource may have at least one type selected from the group of types, consisting of a sub-band based continuous resource unit (sub-band-based CRU), a mini-band based continuous resource unit (mini-band-based CRU), a continuous resource unit with concatenating a plurality of physical resource unit (PRU), a distributed resource unit (DRU). The different types of the different resource blocks may differ.

In an example, the sum of a selection of parameters from the metric profile may have the value 1.

In a further example the metric profile may comprise weight parameter and the sum of the selection of weight parameters may be 1.

Having a sum of 1 for a selection of weight parameter or weight factors may mean that this selection of weight parameter may be normalized at 100%.

Relating some weight parameter to 1 may reduce signaling.

According to another exemplary embodiment of the present invention, the at least one physical parameter of a physical resource or of a resource block is at least one physical parameter selected from the group consisting of a signal to noise ratio (SINR), the size of a resource block within each of the plurality of portions of the transmission resource (N, $N_1$, $N_2$), a Quality of Service (QoS), e.g. a latency value or an available bandwidth, a load of a network, a service type and a buffer status.

The physical parameter may be separated in different groups. There may be service related physical parameters such as QoS, service type and/or α, which may depend on the task or service, which may have to be executed. α may indicate a preference for using a certain type of resource block for a certain task or service.

Physical parameters like load or buffer status may be physical parameters of the network elements or of the network such as physical parameter of BS and/or MS.

Physical parameters such as SINR may belong to the group of physical parameters describing the actual radio conditions or environmental conditions.

For example, the buffer status may be an indication of how many data may be in a buffer and this may have effect to an actual delay within a network or on the air interface. The buffer status may be communicated or signaled implicitly and/or explicitly from the Base Station to the Mobile Station. If the buffer may be full or almost full, some priority or preference for subband selection may exist even if the SINR value may be not good. But if the buffer may not so full, the best or best-M subband and/or miniband may be selected for transmission. In other words, the best subband in relation to SINR and/or metric of the subband may be compared to the best miniband in relation to SINR and/or metric, even if the subband and the miniband may be of different type.

A metric profile may allow dynamically reacting to changing physical parameter, such as the load situation of a buffer by amending the metric profile.

For example, the QoS may be an indication of how many latency may be tolerable, how fast or how much bandwidth may have to be guaranteed, etc. For a latency-tolerant task or service, the essentially best subband and/or miniband may be selected to maximize the spectrum efficiency. I.e. in the latter case the type of the resource block (subband/miniband) may not have to be differentiated. For a latency-nontolerant service, the subband transmission may be prioritized or preferred.

According to another exemplary embodiment of the present invention, the Mobile Station Apparatus may be a Mobile Station according to the IEEE 802.16 standard, to the IEEE 802.16e standard, to the IEEE 802.16m standard or to the LTE standard (Long Term Evolution). The Mobile Station may be a PDA, a laptop, or a cellular phone or an AMS.

The Base Station Apparatus may be a BS, a Base Station, a Base Station according to IEEE 802.16 standard to the to the IEEE 802.16e standard, to the to the IEEE 802.16m standard, a NodeB, an eNodeB or an ABS.

According to another exemplary embodiment of the present invention, the Base Station Apparatus further comprises a signaling device, wherein the Signaling Device may be adapted for implicitly and/or explicitly sending signaling information to a Mobile Station Apparatus in order to enable the Mobile Station Apparatus to get the metric.

Thus, for example the queue in a buffer may be signaled to the MS in order to allow the MS to amend the criterion for selecting portions of resources. The Signaling Device may allow implicit or explicit signaling.

It has also to be noted that exemplary embodiments of the present invention and aspects of the invention have been described with reference to different subject-matters. In particular, some embodiments have been described with reference to apparatus type claims whereas other embodiments have been described with reference to method type claims. However, a person skilled in the art will gather from the above and the following description that unless other notified in addition to any combination between features belonging to one type of subject-matter also any combination between features relating to different subject-matters in particular between features of the apparatus claims and the features of the method claims may be considered to be disclosed with this application.

These and other aspects of the present invention will become apparent from and elucidated with reference to the embodiments described hereinafter.

Exemplary embodiments of the present invention will be described in the following with reference to the following drawings.

BRIEF DESCRIPTION OF THE DRAWINGS

FIG. 3 shows structuring of a transmission resource for a better understanding of the present invention.

DETAILED DESCRIPTION

Figure 1:
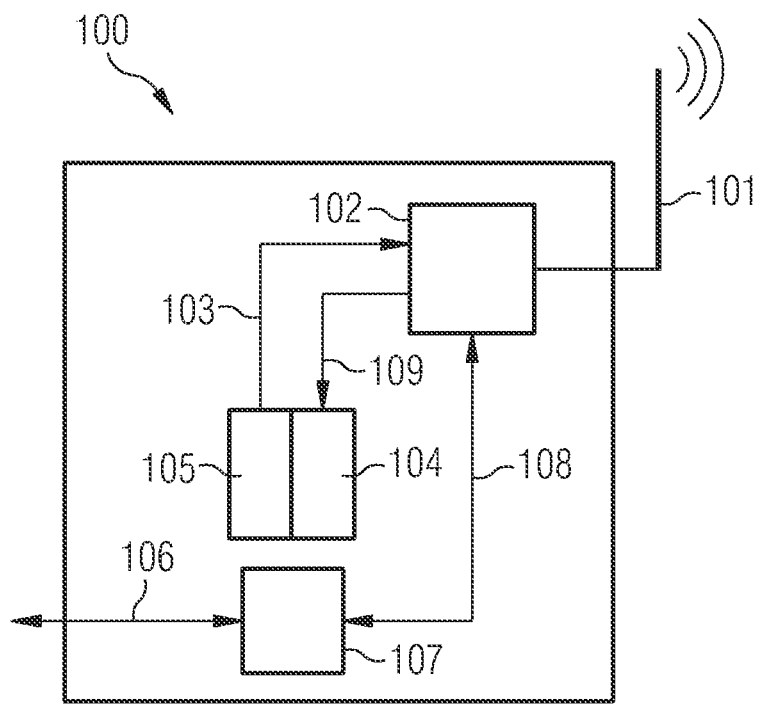
FIG. 1 shows a block diagram of a Mobile Station Apparatus according to an exemplary embodiment of the present invention.

The illustration in the drawings is schematic. In different drawings, similar or identical elements are provided with the same reference numerals.

FIG. 1 shows a Mobile Station Apparatus 100 or MS 100. The MS can use antenna 101 to send and to receive signals from/to a BS (not shown in FIG. 1).

Received signals from antenna 101 reach the Receiving Device 102. The Receiving Device 102 knows the structure of resource division of the transmission resource. Thus, the Receiving Device 102 knows the structure and the allocation of the resource blocks or portions of the transmission resource, e.g. the structure of the air interface.

The Receiving Device 102 can forward via link 109 the received information to the Determining Device 104. The Receiving Device may separate information, which is used for determining the metric from payload information.

Payload information or user data may be forwarded via link 108 to the User Data Device 107, which may be adapted to forward the user data to the interface 106. Furthermore, the User Data Device is adapted to receive user data via interface 106 and to forward the user data via Receiving Device 102 to the air interface 101.

The Receiving Device 102 gathers from the received information physical parameter or transmission parameter. The physical parameter can comprise physical parameter of a resource block or physical parameter of the BS. The physical parameter may reflect the physical state of the entire system at a certain time point. The Receiving Device 102 forwards the physical parameter via link 109 to the Determining Device. Some physical parameter may also be stored within the Receiving Device 102 and/or the Determining Device 104.

A physical parameter such as an occupied buffer size of a buffer in the BS may be transmitted from the BS (not shown in FIG. 1) to the MS 100.

An existing or an amended information element (IE) can be used to transmit parameter values such as the buffersize between the BS and the MS.

The Determining Device 104 may be further adapted for determining a metric profile. Such a metric profile may already be stored within the MS 100, but the metric profile may be received from the BS. The metric profile may allow composing the metric function. Thus, MS 100 may be able with the metric profile to build up a metric function. <With the metric function the MS may calculate for every band the corresponding metric belonging to this band with regard to a task. The calculated metric may allow that a CQI value for the corresponding band may be made comparable to a CQI value of other bands of the same or of other types.

By distributing the profiles via the network equipment the metric profiles can be kept up to date. Furthermore, if a new service is supported the corresponding new metric profile may be distributed to all MS 100. Thus, the metric profiles may be dynamically amended.

A metric profile can relate to a task or a service which may be offered by the MS 100 or by a corresponding BS.

The metric profile can be used for determining a metric for providing a feedback to a BS. As soon as the physical parameter of a resource block is available, the physical parameter are weighted with the corresponding metric profile belonging to a task or to a service. Thus, a metric value can be generated.

The metric is transferred from the Determining Device 104 to the Provisioning Device 105, which sends the metric via link 103 and Receiving Device 102 to a BS (not shown in FIG. 1). Instead of sending a metric to the BS, the corresponding CQI value and the PMI index may be sent to the BS.

The metric may be used to decide "best M". The metric is not only related to CQI or SINR of the corresponding resource block or portion of the transmission resource, the metric is also determined by other factors beside the CQI. These factors can include the size of the resource N, the quality of service (QoS), system load information, DL buffer status for the AMS, and service type, etc. For subband and miniband, the size of the resource block N is equal to $N_1$ and $N_2$, respectively. If the allocated CRUs are adjacent, N can be a number between $N_1$ and $N_2$. For the ith resource block, the metric is given by $$c_i = f(SINR_i, N, QoS, load, \ldots, \text{service type}, \text{buffer status})$$

$f(\cdot)$ is a metric function. For instance, $f(\cdot)$ can be given by $$f(SINR_i, N, QoS, load, \ldots, \text{service type}, \text{buffer status}) = \alpha \log(1 + CQI_i)$$

CQI is calculated from the physical measured parameter SINR. The rule $\alpha \log(1+ \ldots)$ is a predetermined rule for calculating the metric for resource block i and for the actual task or the actual service.

In an example the metric $c_i$ is calculated for every resource block i but only the M highest value of the calculated metric $c_i$ are reported to the BS in order to achieve a best M selection. Instead of transmitting the metric $c_i$ the corresponding $CQI_i$ value of resource block i and $PMI_i$ value can be transmitted.

$\alpha$ is an weighting decided by N and other factors. Assuming $\alpha_1, \alpha_2$ is the weighting for subband and miniband with regard to the service, respectively, $\alpha_1, \alpha_2$ shall satisfy the following equation:

$$\alpha_1 + \alpha_2 = 1$$

For example, for small packet service, e.g., VoIP, $\alpha_1$ may be 0 and $\alpha_2$ may be 1. For larger packet service, if it is latency-non-tolerated, $\alpha_1$ may be 1 and $\alpha_2$ may be 0; if it is latency-tolerated or latency-tolerant and buffer is not full, both $\alpha_1$ and $\alpha_2$ may be 0.5. If it is latency-tolerated and buffer is almost full, $\alpha_1$ may be greater than 0.5, while $\alpha_2$ may be smaller than 0.5, etc. In order to increase the priority for subbands even if their CQI value is low.

In the case that the service is latency-tolerated or latency tolerant and the buffer is almost full, the metric profile may contain for subband: $\alpha 1 = 0.8$;
for miniband: $\alpha 2 = 0.2$.

Using this profile the MS builds the corresponding metric function. In an example 5 bands exist corresponding to 11 PRU. These are divided in 2 subbands (2×N1=8) and 3 minibands (3×N2=3).

Thus, the metric functions may be like this:
Subband1: $c_1 = 0.8 \log(1 + CQI_1)$;
Subband2: $c_2 = 0.8 \log(1 + CQI_2)$;
Miniband1: $c_3 = 0.2 \log(1 + CQI_3)$;
Miniband2: $c_4 = 0.2 \log(1 + CQI_4)$;
Miniband3: $c_5 = 0.2 \log(1 + CQI_5)$.

This results in 5 metrics which can be compared in order to find CQIi values which can be sent to the BS. If M=3 the best 3 of the 5 metrics have to be found.

It can also be extended to the system with more types CRU besides subband and miniband. For example, one resource block is concatenated by two or more adjacent CRUs. When multiple types CRU are present in the FP (Frequency Partition), the above equation shall be extended into:

$$\sum_{i=1}^{K} \alpha_i = 1$$

where $\alpha_i$ is the weighting for the ith type resource block, and K is the total number of types.

Each Mobile station will calculate the metric $c_i$, and select the best-M resource block based on $c_i$, and feed back the corresponding information, i.e. $CQI_i$ and/or $PMI_i$.

In each frequency partition, subband and miniband are put together and indexed in a unified way. For subband, the CQI is average over $N_1$ CRUs; For miniband, the CQI is average over $N_2$ CRUs. Based on the QoS, system load information, DL buffer status, BS will implicitly or explicitly signaling information to enable MS to get the metric. The AMS will order or calculate the metric $c_i$, pick the M resource blocks corresponding to the best-M metric $c_i$, and feed back the related information to the ABS.

For example alpha can be 0.8 for subband, and 0.2 for miniband or mini-band. Such a selection of the weighting, shows the preference for using subband. In another case, alpha can be 0.5 for subband and 0.5 for miniband. In this case, it does not show any priority for subband and miniband. It falls back to the traditional best-M method, where the best M bands are corresponding to the first M largest CQI. The value of alpha can be adjusted to show some priority to the usage of subband and miniband. This prioritization or preference may depend on a corresponding service.

Relating some weight parameter to the value 1 may reduce signaling. For example, if alpha can be any number. E.g., 4 is for subband, and 1 is for miniband, both values 4 and 1 would be needed to signal simultaneously. But with normalized weighting, to achieve the same result, alpha shall be 0.8 and 0.2 for subband and miniband, respectively. With these normalization, only 0.8 for subband needs to be signaled. The alpha can be derived based on this normalization.

Figure 2:
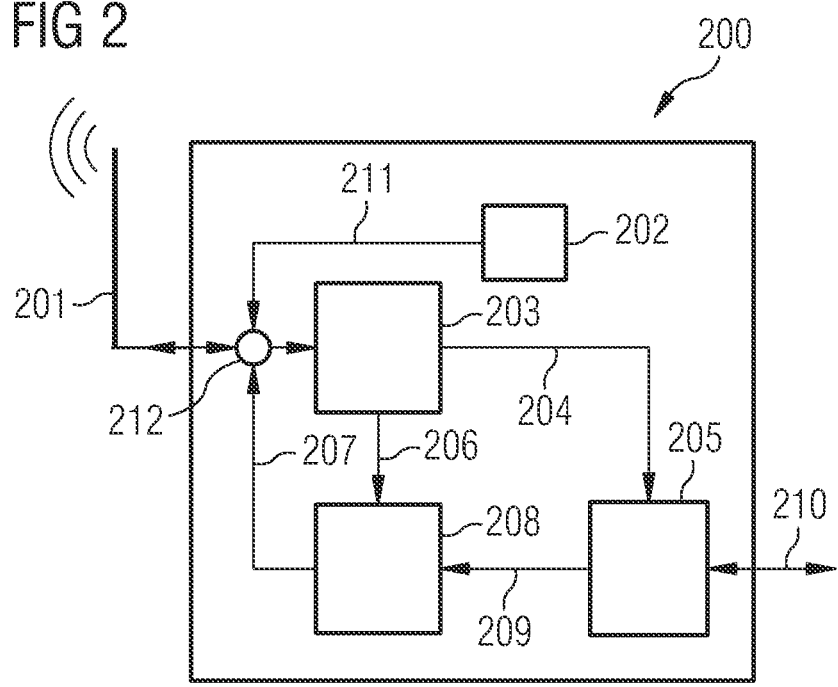
FIG. 2 shows a block diagram of a Base Station Apparatus according to an exemplary embodiment of the present invention.

FIG. 2 shows a block diagram of a Base Station Apparatus 200 or AMS 200. Via antenna 201 the BS 200 has access to MSs (not shown in FIG. 2). Antenna 201 can receive and/or send data. With a filter 212 received information and information for sending can be separated or added.

The Signaling Device 202 can send signaling information via link 211 and filter 212 to the antenna 201 using implicit or explicit signaling. The Signaling Device 202 may trigger a remote MS (not shown in FIG. 2) for delivering and determining the metric data or may deliver the required parameter for calculating the metric.

In the Metric Receiving Device 203 metric information and user information is separated. User information is sent on link 204 to Data Device 205. Data Device 205 forwards the user information to the interface 210.

Metric Receiving Device 203 sends metric information or information of a metric on link 206 to the Structuring Device 208.

Dependent on the received metric information, e.g. CQI and PMI, the transmission resource between Base Station Apparatus 200 and MS 100 (not shown in FIG. 2) is divided or structured in sub channels, resource blocks or existing partitions, which may be loaded with data to be transmitted in accordance with the actual environment conditions expressed by the received metric.

The BS 200 can receive a metric and a PMI value or a CQI and a PMI value. The BS 200 can take this information as a basis for its decisions but the BS is not bound to it. The BS 200 can coordinate the received information with an actual status on BS side and may let a scheduler in the Structuring Device 208 decide how to proceed. It could be possible, that while the metric information arrives another user of a different MS already requires resources requested by the CQI and/or PMI just received. Then the scheduler decides which task or service get access to the resources and may change the preference compared to the indication in the CQI and/or in the PMI.

A PMI is a reference to a preferred pre-coding matrix.

User data received on link 209 can use the generated structure in order to use the available transmission resources effectively. The structured data is sent via link 207 to antenna 201. The Structuring Device 208 can map the metric with relevant services or service profiles and distribute data to the appropriate resources taking into account the metric information received from the MS. The metric reflects the state of individual resource blocks.

FIG. 3 shows structuring of a transmission resource for a better understanding of the present invention.

In FIG. 3 a transmission resource or subframe 300 is shown. This subframe corresponds to a bandwidth usable for a communication between MS and BS, e.g. on the air interface.

The subframe 300 is divided in 24 portions or PRUs 301.

$N_1=4$ adjacent PRUs 302 are combined to form subbands 303.

The remaining PRUs 304 are used for the minibands 305. Since for miniband PRU or $PRU_{MB}$ $N_2=1$ there is no requirement to keep them adjacent, by permutating the $PRU_{MB}$ a permutated miniband 306 $PPRU_{MB}$ can be formed.

The miniband PRUs 305, 306 have a first type and the subband PRUs 303 have a second type, which may differ from the first type.

The $PRU_{SB}$ 303 and the $PPRU_{MB}$ can be allocated to the two frequency partitions 307, 308. Therefore, the partitions 307, 308 comprise subband PRUs 309, 310 and miniband PRUs 311, 312. Thus, a partition comprise different types of resources.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

ACRONYMS AND TERMINOLOGY

CRU: continuous resource unit
DRU: Distributed resource unit
PRU: Physical resource unit
MIMO: Multiple Input and multiple output
CQI: Channel quality indicator
PMI: Preferred matrix index
AMS: Advanced Mobile station
ABS: Advanced Base station
FP: Frequency partition

The invention claimed is:
1. An apparatus comprising:
at least one processor; and
at least one memory including computer program code,
the at least one memory and the computer program code configured, with the at least one processor, to cause the apparatus to perform the following:

receiving information via a plurality of resource blocks of a transmission resource, said plurality of resource blocks being divided into a plurality of subbands and minibands;

gathering from the received information a Channel Quality Index (CQI) in combination with at least one factor or one physical parameter, for each of the plurality of subbands and minibands;

determining a metric profile corresponding to a task, said metric profile comprising at least one weight parameter for the corresponding at least one factor or one physical parameter for each of the plurality of subbands and minibands, wherein the weight parameter value represents a measure for a significance of the corresponding at least one factor or one physical parameter of the plurality of subbands and minibands with regard to the task;

determining a metric for each of the plurality of subbands and minibands by applying the metric profile to the at least one factor or one physical parameter using a predetermined rule dependent from the task;

selecting a predetermined number of the plurality of subbands and minibands, such that the selected subbands and minibands meet a predefined criteria best M; and providing Channel Quality Index (CQI) and Preferred Matrix Index (PMI) information corresponding to the predetermined number of the plurality of subbands and minibands to a Base Station Apparatus, wherein only the M highest ranking subbands and minibands are selected for reporting, wherein the apparatus is a Mobile Station Apparatus for organizing the transmission resource between the Base Station Apparatus and the Mobile Station Apparatus dependent on the task.

2. The apparatus of claim 1, wherein the task is at least one of:
providing a service; and
transmitting a data packet and/or a voice packet.

3. The apparatus of claim 1, wherein the metric is at least one value selected from the group of values consisting of:
a metric value;
a Channel Quality Indicator; and
a Preferred Matrix index.

4. The apparatus of claim 1, wherein the at least one physical parameter of a resource block is at least one physical parameter selected from the group consisting of:
a signal to noise ratio;
a size of a resource block;
a Quality of Service;
a load;
a service type; and
a buffer status.

5. The apparatus of claim 1, wherein the apparatus is a mobile station according to at least one of the standards IEEE 802.16, IEEE 802.16e, IEEE 802.16m and LTE.

6. A method comprising:
receiving information via a plurality of resource blocks of a transmission resource, said plurality of resource blocks being divided into a plurality of subbands and minibands;

gathering from the received information a Channel Quality Index (CQI) in combination with at least one factor or one physical parameter, for each of the plurality of subbands and minibands;

determining a metric profile corresponding to a task, said metric profile comprising at least one weight parameter for the corresponding at least one factor or one physical parameter for each of the plurality of subbands and minibands, wherein the weight parameter value represents a measure for a significance of the corresponding at least one factor or one physical parameter of the plurality of subbands and minibands with regard to the task;

determining a metric for each of the plurality of subbands and minibands by applying the metric profile to the at least one factor or one physical parameter using a predetermined rule dependent from the task;

selecting a predetermined number of the plurality of subbands and minibands, such that the selected subbands and minibands meet a predefined criteria best M; and providing Channel Quality Index (CQI) and Preferred Matrix Index (PMI) information corresponding to the predetermined number of the plurality of subbands and minibands to a Base Station Apparatus, wherein only the M highest ranking subbands and minibands are selected for reporting, wherein the method is one for organizing the transmission resource between the Base Station Apparatus and a Mobile Station Apparatus dependent on the task.

7. The method as claimed in claim 6, wherein the task is at least one of:
providing a service; and
transmitting a data packet and/or a voice packet.

8. The method as claimed in claim 6, wherein the metric is at least one value selected from the group of values consisting of:
a metric value;
a Channel Quality Indicator; and
a Preferred Matrix index.

9. The method as claimed in claim 6, wherein the at least one physical parameter of a resource block is at least one physical parameter selected from the group consisting of:
a signal-to-noise ratio;
a size of a resource block;
a Quality of Service;
a load;
a service type; and
a buffer status.

10. An apparatus comprising:
at least one processor; and
at least one memory including computer program code, the at least one memory and the computer program code configured, with the at least one processor, to cause the apparatus to perform the following:
receiving Channel Quality Index (CQI) and Preferred Matrix Index (PMI) corresponding to a predetermined number of a plurality of subbands and minibands from a Mobile Station Apparatus, wherein only a M highest ranking subbands and minibands are selected for reporting, said predetermined number of the plurality of subbands and minibands being selected such that the selected subbands and minibands meet a predefined criteria best based on a metric, said metric being obtained by the Mobile Station Apparatus by applying a metric profile to at least one factor or one physical parameter, for each of a plurality of subbands and minibands, said plurality of subbands and minibands being divided from a plurality of resource blocks, wherein the at least one factor or one physical parameter is in combination with a Channel Quality Index (CQI), using a predetermined rule, said metric profile comprising at least one weight parameter for the corresponding at least one factor or one physical parameter for each of the plurality of subbands and minibands, wherein the weight parameter value represents a measure for a significance of the corresponding at least one factor or one physical parameter of the plurality of subbands and minibands with regard to a task;

deciding about employing the information of the metric; and structuring a transmission resource between the apparatus and the Mobile Station Apparatus depending on the task and in accordance with the received information of the metric in the case of employing the information of the metric, wherein the apparatus is a Base Station Apparatus for allocating the transmission resource.

11. The apparatus of claim 10, wherein the at least one memory and the computer program code are further configured, with the at least one processor, to cause the apparatus to send implicit and/or explicit signaling information to the Mobile Station Apparatus in order to enable the Mobile Station Apparatus to get the metric.

12. The apparatus of claim 10, wherein the apparatus is a base station according to at least one of the standards IEEE 802.16, IEEE 802.16e, IEEE 802.16m and LTE.

13. A method comprising:

receiving Channel Quality Index (CQI) and Preferred Matrix Index (PMI) corresponding to a predetermined number of a plurality of subbands and minibands from a Mobile Station Apparatus, wherein only a M highest ranking subbands and minibands are selected for reporting, said predetermined number of the plurality of subbands and minibands being selected such that the selected subbands and minibands meet a predefined criteria best based on a metric, said metric being obtained by the Mobile Station Apparatus by applying a metric profile to at least one factor or one physical parameter, for each of a plurality of subbands and minibands, said plurality of subbands and minibands being divided into from a plurality of resource blocks, wherein the at least one factor or one physical parameter is in combination with a Channel Quality Index (CQI), using a predetermined rule, said metric profile comprising at least one weight parameter for the corresponding at least one factor or one physical parameter for each of the plurality of subbands and minibands, wherein the weight parameter value for the corresponding at least one factor or one physical parameter represents a measure for a significance of the corresponding at least one factor or one physical parameter of the plurality of subbands and minibands with regard to a task;

deciding about employing the information of the metric;

structuring a transmission resource between a Base Station Apparatus and the Mobile Station Apparatus depending on the task and in accordance with the received information of the metric in the case of employing the information of the metric, wherein the method is one for allocating the transmission resource.

14. The method as claimed in claim 13 further comprising:

sending implicit and/or explicit signaling information to the Mobile Station Apparatus in order to enable the Mobile Station Apparatus to get the metric.

15. A computer program product comprising a non-transitory computer-readable storage medium bearing computer program code embodied therein for use with a computer, the computer program code comprising code for performing at least one method of:

a first method comprising:

receiving information via a plurality of resource blocks of a transmission resource, said plurality of resource blocks being divided into a plurality of subbands and minibands;

gathering from the received information a Channel Quality Index (CQI) in combination with at least one factor or one physical parameter, for each of the plurality of subbands and minibands;

determining a metric profile corresponding to a task, said metric profile comprising at least one weight parameter for the corresponding at least one factor or one physical parameter for each of the plurality of subbands and minibands, wherein the weight parameter value represents a measure for a significance of the corresponding at least one factor or one physical parameter of the plurality of subbands and minibands with regard to the task;

determining a metric for each of the plurality of subbands and minibands by applying the metric profile to the at least one factor or one physical parameter using a predetermined rule dependent from the task;

selecting a predetermined number of the plurality of subbands and minibands, such that the selected subbands and minibands meet a predefined criteria best M; and providing Channel Quality Index (CQI) and Preferred Matrix Index (PMI) information corresponding to the predetermined number of the plurality of subbands and minibands to a Base Station Apparatus, wherein only the M highest ranking subbands and minibands are selected for reporting, wherein the method is one for organizing the transmission resource between the Base Station Apparatus and a Mobile Station Apparatus dependent on the task; and a second method comprising:

receiving Channel Quality Index (CQI) and Preferred Matrix Index (PMI) corresponding to a predetermined number of a plurality of subbands and minibands from a Mobile Station Apparatus, wherein only a M highest ranking subbands and minibands are selected for reporting, said predetermined number of the plurality of subbands and minibands being selected such that the selected subbands and minibands meet a predefined criteria best based on a metric, said metric being obtained by the Mobile Station Apparatus by applying a metric profile to at least one factor or one physical parameter, for each of a plurality of subbands and minibands, said plurality of subbands and minibands being divided from a plurality of resource blocks, wherein the at least one factor or one physical parameter is in combination with a Channel Quality Index (CQI), using a predetermined rule, said metric profile comprising at least one weight parameter for the corresponding at least one factor or one physical parameter for each of the plurality of subbands and minibands, wherein the weight parameter value for the corresponding at least one factor or one physical parameter represents a measure for a significance of the corresponding at least one factor or one physical parameter of the plurality of subbands and minibands with regard to the task;

deciding about employing the information of the metric;
structuring a transmission resource between a Base Station Apparatus and the Mobile Station Apparatus depending on the task and in accordance with the received information of the metric in the case of employing the information of the metric,
wherein the second method is one for allocating the transmission resource.

* * * * *

UNITED STATES PATENT AND TRADEMARK OFFICE
CERTIFICATE OF CORRECTION

PATENT NO. : 9,871,620 B2
APPLICATION NO. : 13/266334
DATED : January 16, 2018
INVENTOR(S) : Shaohua Li and Xin Qi It is certified that error appears in the above-identified patent and that said Letters Patent is hereby corrected as shown below:

In Claim 13:
Column 17, Line 39, "into" should be deleted.

Signed and Sealed this
First Day of May, 2018

Andrei Iancu
*Director of the United States Patent and Trademark Office*